(12) United States Patent  
Inoue

(10) Patent No.: US 6,189,410 B1  
(45) Date of Patent: Feb. 20, 2001

(54) TRANSAXLE CASING

(75) Inventor: Toru Inoue, Amagasaki (JP)

(73) Assignee: Kanzaki Kokyukoki Mfg. Co., Ltd., Amagasaki (JP)

( * ) Notice: Under 35 U.S.C. 154(b), the term of this patent shall be extended for 0 days.

(21) Appl. No.: 09/159,081

(22) Filed: Sep. 23, 1998

(30) Foreign Application Priority Data

Sep. 24, 1997 (JP) .................................................. 9-258961

(51) Int. Cl.$^7$ .............................. F16H 57/02; F16D 39/00
(52) U.S. Cl. ........................... 74/606 R; 60/487; 60/464; 74/607; 475/83
(58) Field of Search ................................ 74/606 R, 607; 60/487, 464; 277/35, 37, 58; 475/83, 84; 29/464, 469

(56) References Cited

U.S. PATENT DOCUMENTS

| | | | |
|---|---|---|---|
| 4,852,426 | * 8/1989 | DeRees | 74/607 |
| 4,953,426 | * 9/1990 | Johnson | 74/606 R |
| 5,156,576 | * 10/1992 | Johnson | 475/72 |
| 5,182,966 | * 2/1993 | Von Kaler et al. | 74/600 R |
| 5,203,169 | * 4/1993 | Ishii et al. | 60/487 |
| 5,211,077 | * 5/1993 | Louis et al. | 74/606 R |
| 5,473,964 | * 12/1995 | Okada et al. | 60/487 X |
| 5,782,142 | * 7/1998 | Abend et al. | 74/606 R |
| 5,937,709 | * 8/1999 | Crawford et al. | 29/464 X |
| 5,979,270 | * 11/1999 | Thoma et al. | 475/83 X |

FOREIGN PATENT DOCUMENTS

| | | | |
|---|---|---|---|
| 1810040 | * 8/1969 | (DE) | 60/487 |
| 229655 | * 8/1969 | (AT) | 60/487 |

\* cited by examiner

Primary Examiner—Vinh T. Luong  
(74) Attorney, Agent, or Firm—Sterne, Kessler, Goldstein & Fox PLLC

(57) ABSTRACT

A transaxle casing for a vehicle is adapted for various types of loading through the use of bearing holders. Power from an engine of the vehicle is transmitted to a differential in a transaxle casing. The transaxle casing has laterally outwardly extending left and right axle housing portions. Left and right driving axles are supported in the axle housing portions of the transaxle casing through bearings. Concavities are formed in each of the axle housing portions. When the transaxle casing is employed by a light vehicle or under a light load, needle bearings and seals are fitted in the concavities of the axle housing portions for journalling the ends of the left and right driving axles. When the transaxle casing is employed by a heavy vehicle or under a heavy load, the needle bearings and seals are removed and bearing holders containing ball bearings are attached to the ends of the axle housing portions by inserting convexities formed in the bearing holders into the concavities of the axle housing portions.

12 Claims, 7 Drawing Sheets

TRANSAXLE CASING

BACKGROUND OF THE INVENTION

1. Field of the Invention

The present invention is directed to a transaxle casing and a bearing holder which is adaptable to the same transaxle casing irrespective of various types of loading.

2. Related Art

With regard to a conventional vehicle like a tractor, power from an engine is transmitted to a differential in an transaxle casing. The transaxle casing has laterally outwardly extending left and right axle housing portions. Left and right driving axles, with driving wheels provided on the utmost ends thereof, are journalled through bearings in the respective left and right axle housing portions.

In the conventional art, needle bearings are provided in both axle housing portions of the transaxle casing to minimize the large radial stresses subjected thereon. If, to save the costs of modification thereof, the same transaxle casing is used with a heavier vehicle or under a heavier load, the axles are bent and pressed against the needle bearings, resulting in damage or abrasion of the axles. It is conceivable that ball bearings can be used instead of the needle bearings to protect the axles from damage or abrasion, however, it becomes necessary to change the structure of the transaxle casing and thus entails a higher cost, because the outer diameter of a ball bearing is larger than that of a needle bearing. The present invention solves this problem by providing a structure wherein driving axles can be journalled by the use of ball bearings within the same transaxle casing which is conventionally employed with needle bearings.

SUMMARY OF THE INVNETION

The present invention is constructed as follows in order to solve the conventional problems mentioned above:

Each of the laterally outwardly extending left and right axle housing portions of a transaxle casing is provided at an end thereof with a concavity or concavities for retaining a needle bearing and a seal. A bearing holder provided with an outward convexity is attached to the end of each axle housing portion by inserting the convexity into the outward opening of one of the concavities, so that an axle can be journalled in each axle housing portion and each bearing holder.

DETAILED DESCRIPTION OF THE PREFERRED EMBODIMENTS

Figure 1:
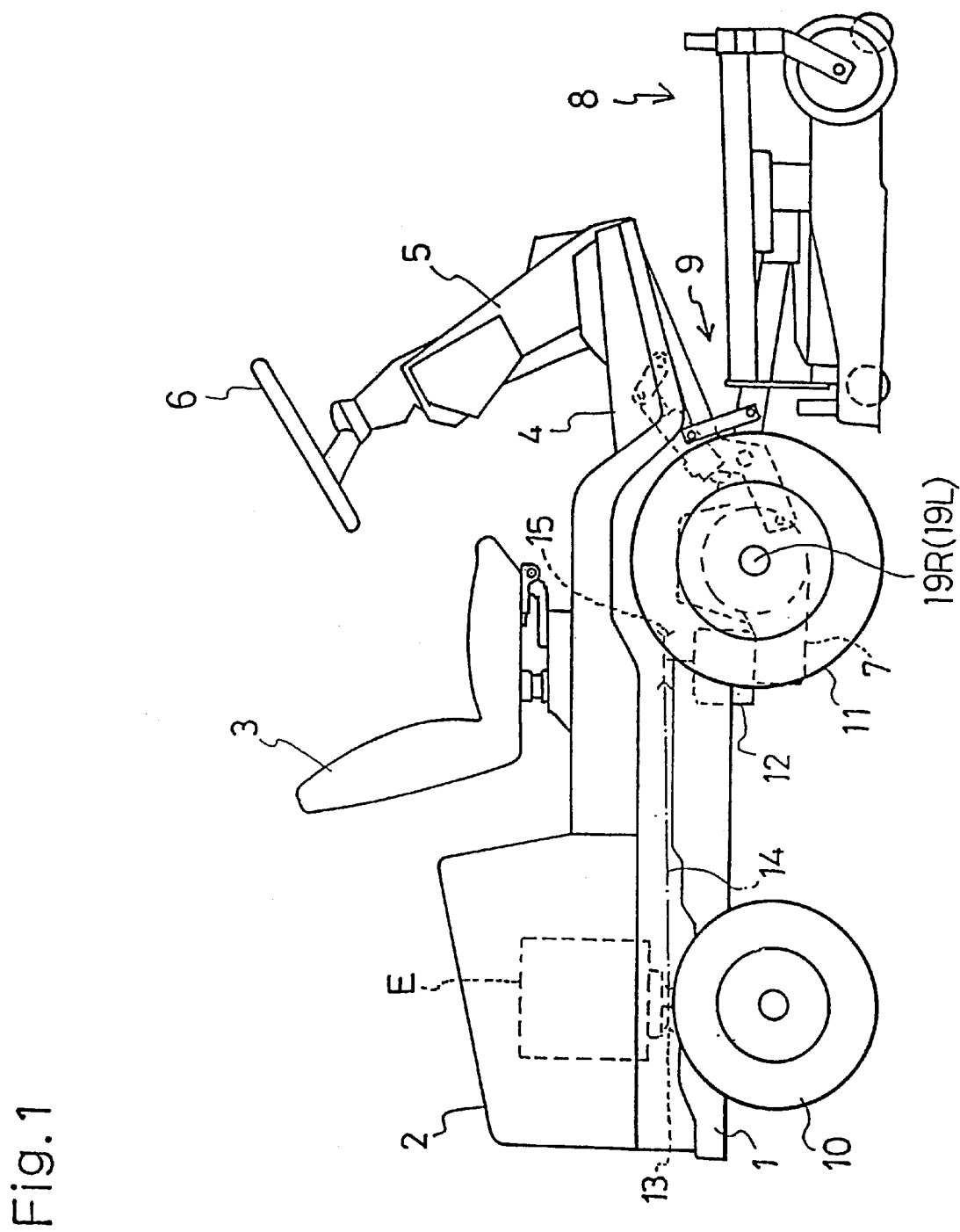
FIG. 1 is a right side view of a riding mower having a transaxle casing according to the present invention.
Figure 2:
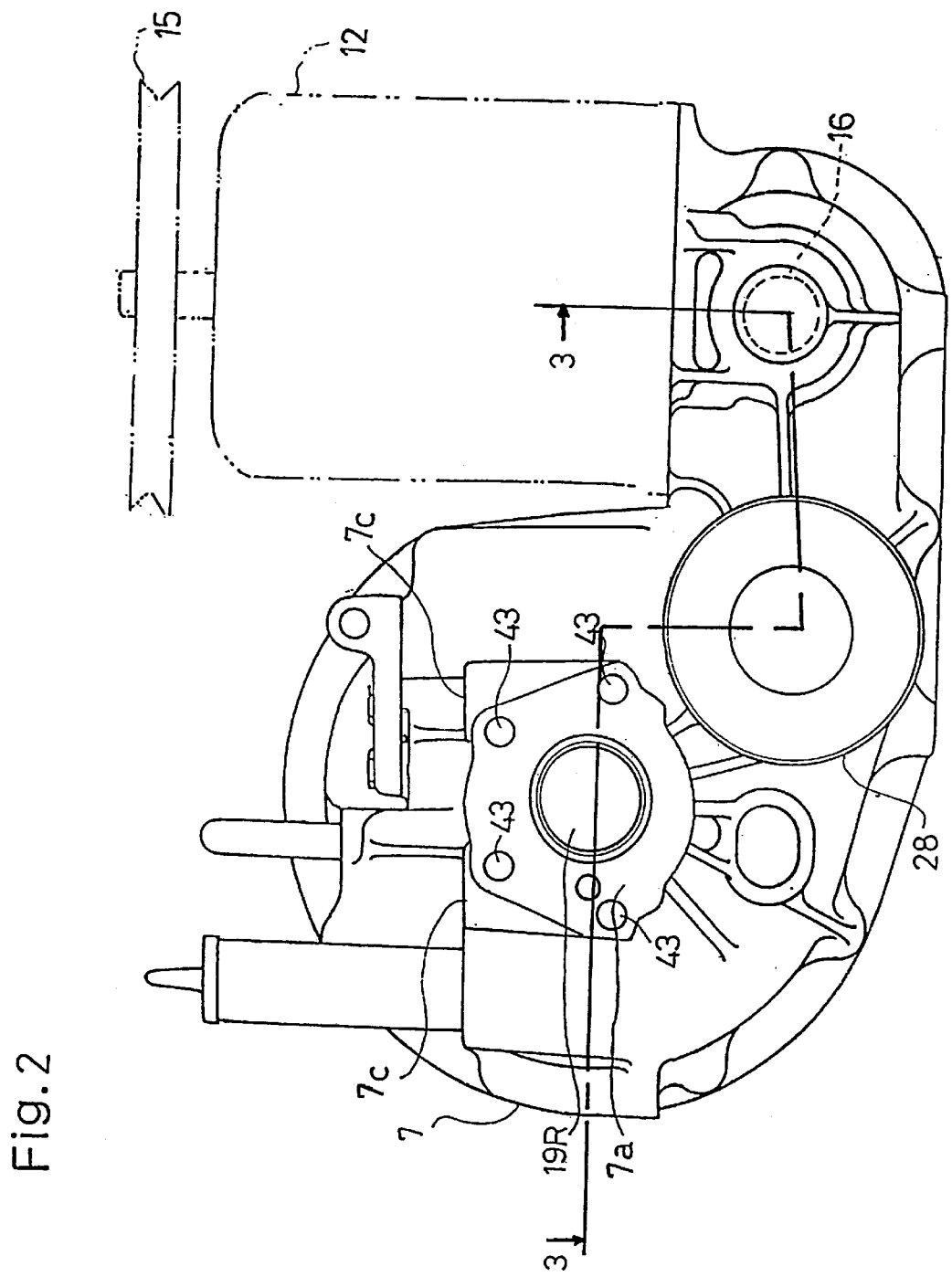
FIG. 2 is a left side view of a transaxle casing according to the present invention.

Explanation will be now given of an embodiment of a tractor provided at the front portion thereof with a mower and a transaxle casing for supporting front wheels in accordance with the present invention. Referring to FIGS. 1 and 2, an engine E is mounted on the rear portion of a body frame 1 of the tractor so as to be disposed in a bonnet 2. A seat 3 is provided in front of bonnet 2. The upper front portion of body frame 1 is used as a footboard 4. A steering column 5 having a handle 6 thereon is erected on the center ofthe front portion of footboard 4. Body frame 1 supports steerable rear wheels 10 and front driving wheels 11 at respective rear and front portions thereof. A working machine attachment linkage extends forward from body frame 1 so as to raise and lower one or more mowers 8, as required.

Figure 3:
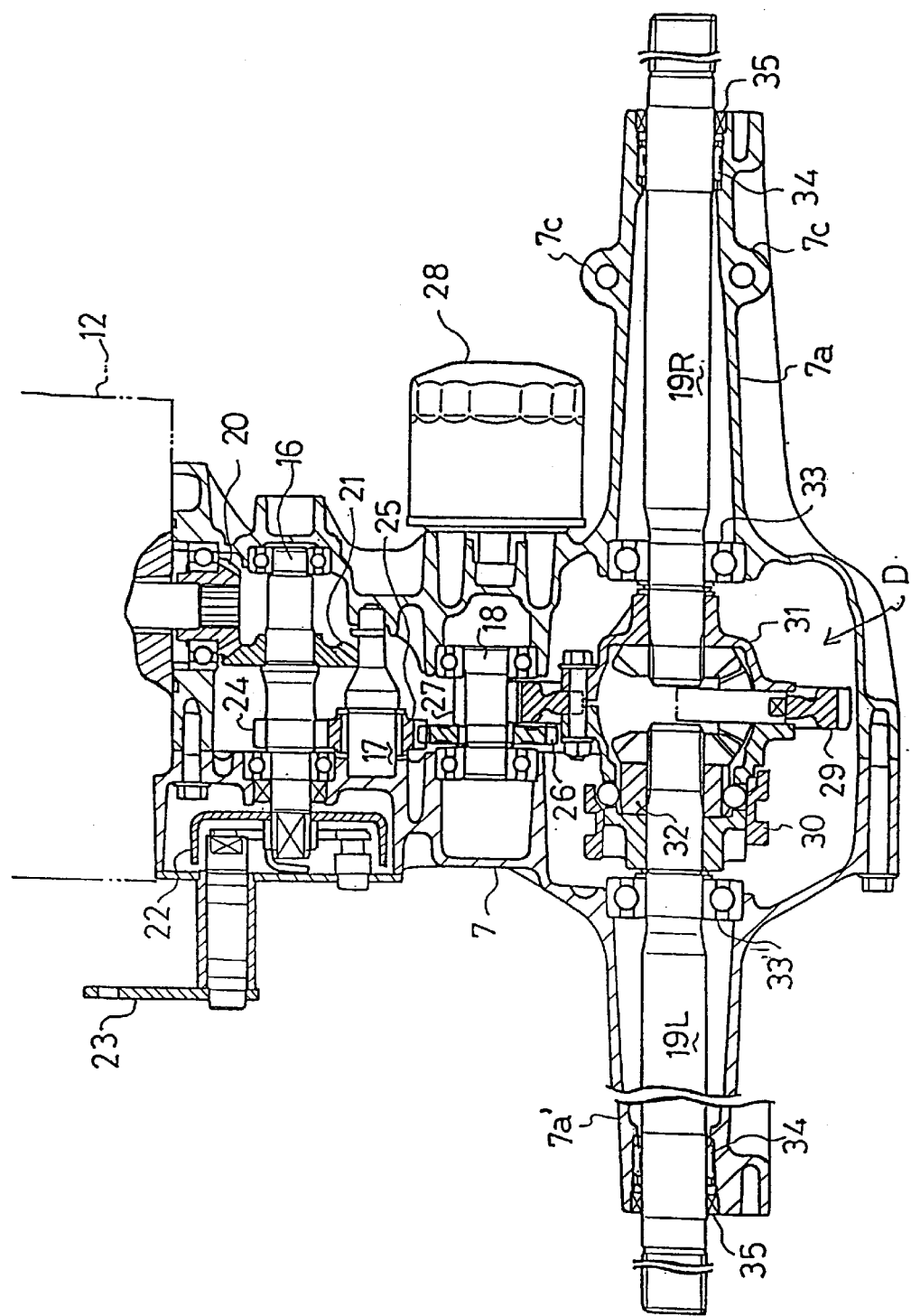
FIG. 3 is a sectional view of a transaxle casing according to the present invention taken along line 3—3 in FIG. 2.

Body frame 1 supports a transaxle casing 7 below seat 3. A hydrostatic transmission (HST) 12 is attached onto the upper surface of the rear portion of casing 7. Power is transmitted from engine E to HST 12. An output pulley 13 is fixed onto a drive shaft projecting vertically downward from engine E and power can be transmitted from output pulley 13 to an input pulley 15 fixed on an input shaft of HST 12 through a belt 14. Transaxle casing 7, as shown in FIGS. 2 and 3, is laterally separable. A first transmission shaft 16, a second transmission shaft 17, a third transmission shaft 18 and left and right axles 19L and 19R are laterally horizontally supported in casing 7.

HST 12 is fixed on the rear portion of casing 7. A motor shaft (output shaft) of HST 12 projects into casing 7. A bevel gear 20 fixed on the motor shaft in casing 7 engages with a bevel gear 21 fixed on first transmission shaft 16. A brake drum 22 is fixed on one end of first transmission shaft 16. A brake shoe is pressed against brake drum 22 by operation of a brake lever 23 provided on the exterior of casing 7, thereby stopping first transmission shaft 16.

A gear 24, fixed on the intermediate portion of first transmission shaft 16, engages with a gear 25 rotatably supported on second transmission shaft 17 through a bearing. Gear 25 engages with a large diametric gear 26 fixed on third transmission shaft 18. A small diametric gear 27, also fixed on third transmission shaft 18, engages with a ring gear 29 of a differential D. Both inner ends of left and right axles 19L and 19R are differentially connected to differential D. Differential D includes a differential locking mechanism. Balls are retained by a differential casing 31 and a detent member 32 is fixed on axle 19L. A slider 30 is slidably fitted on differential casing 31. When the balls are fitted to detent member 32 by sliding operation of slider 30, both left and right axles 1L and 19R are differentially locked. An oil filter 28 is also disposed in casing 7. Transaxle casing 7 is provided on both lateral sides with left and right axle housing portions 7a' extending laterally outwardly therefrom. Both left and right axles 19L and 19R are rotatably supported in the respective axle housing portions 7a', 7a through bearings. The inside end portions of both axles 19L and 19R are rotatably supported by ball tearings 33 adjacent to differential casing 31.

Figure 4:
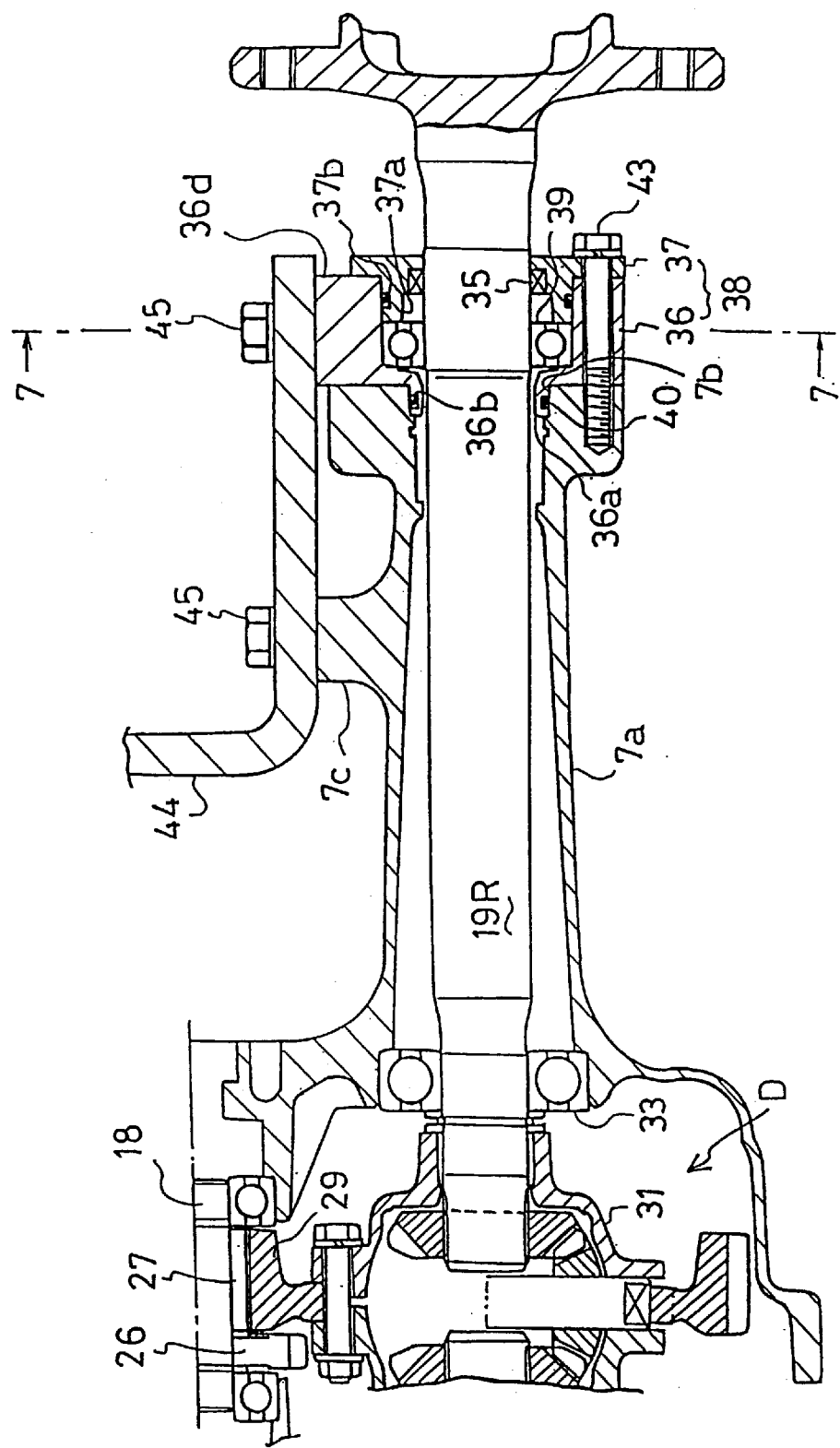
FIG. 4 is a cross-sectional front view of a transaxle casing provided with a bearing holder according to the present invention.
Figure 7:
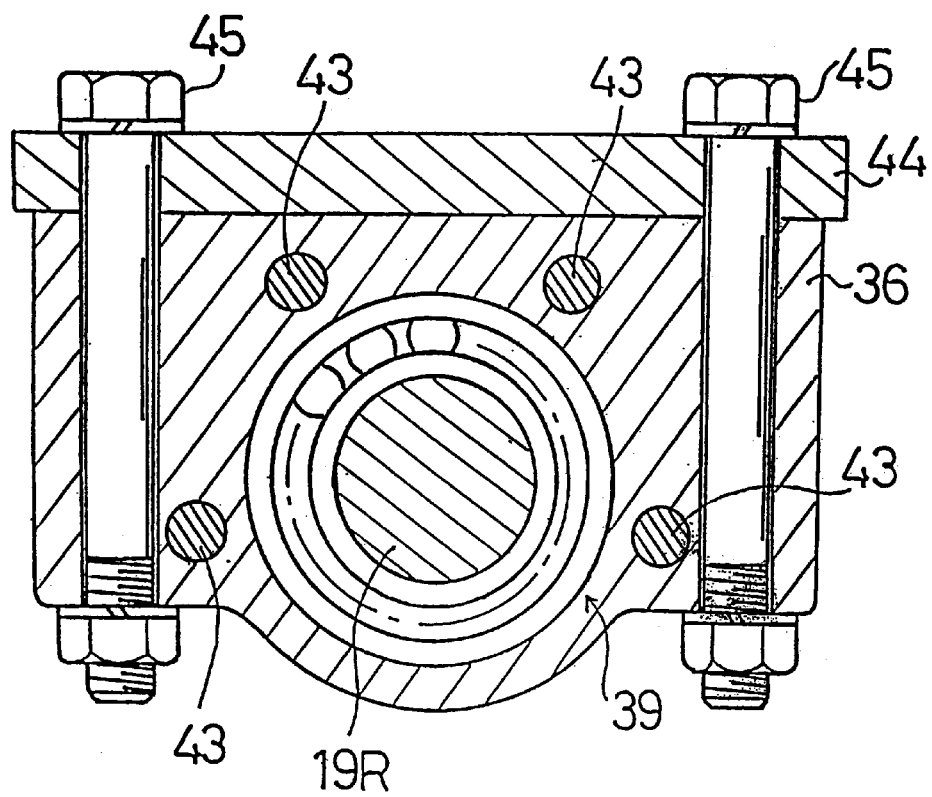
FIG. 7 is a sectional view taken along line 7—7 of FIG. 4.

If transaxle casing 7 is employed by a light vehicle or under a light load, the end portions of axles 19L and 19R are rotatably supported by small low-resistant needle bearings 34 because the stresses against axles 19L and 19R are small. A concavity 7d for accommodating needle bearings 34 and a concavity 7b for accommodating a seal 35 in succession to concavity 7d are formed in each axle housing 7a', portion 7a so as to be coaxial with axle housing 7a' portion 7a. Needle bearings 34 are interposed between respective concavities 7d and axles 19L and 19R, thereby rotatably supporting axles 19L and 19R in the respective axle housing portions 7a', 7a. Seals 35 are interposed between respective concavities 7b and axles 19L and 19R, providing a seal therebetween. Bosses 7c are formed above the middle areas of axle housing portions 7a', 7a so as to fasten to respective attachment stays 44 provided on the front portion of body frame 1 by bolts 45, as shown in FIGS. 4 and 7.

Figure 5:
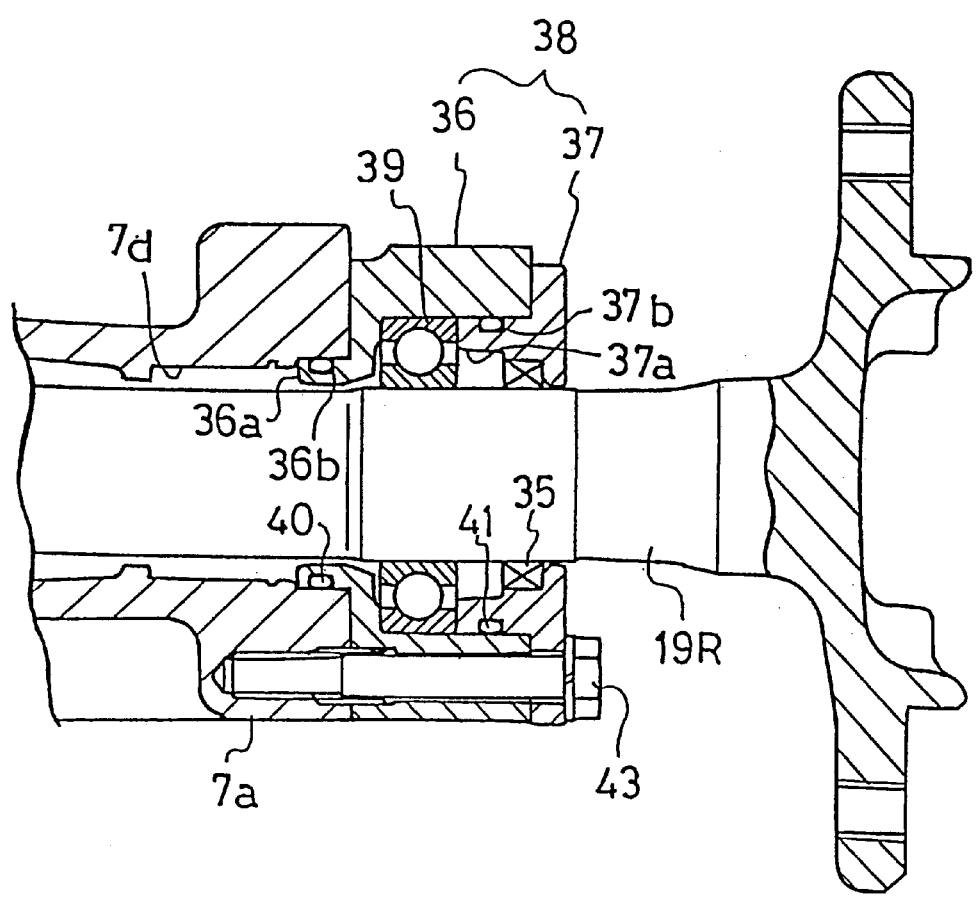
FIG. 5 is a magnified sectional front view of a transaxle casing provided with a bearing holder according to the present invention.
Figure 6:
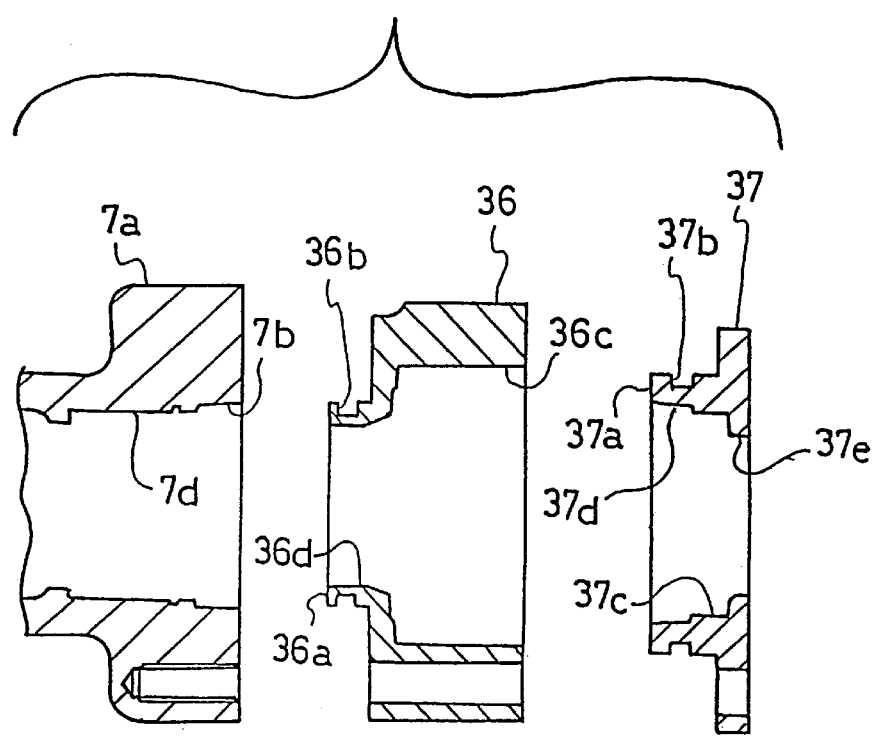
FIG. 6 is an exploded sectional front view of a bearing holder according to the present invention.

When transaxle casing 7 is employed by a heavy vehicle or under a heavy load, needle bearings 34 and seals 35 are removed from casing 7 and bearing holders 38 containing large high-resistant ball bearings 39 are attached to casing 7 for journalling the ends of axles 19L and 19R. Each of bearing holders 38 consists of a body 36 and a cover 37. As shown in FIGS. 5 and 6, body 36 is integrally provided with a horizontally axially cylindrical convexity 36a projecting outwardly from one vertical flat outer surface 36d of body thereof The outer diameter of convexity 36a has an identical size with the inner diameter of concavity 7b, so as to be tightly fitted in concavity 7b. Thus, when convexity 36a is fitted in concavity 7b, they can be disposed coaxially with each other. Convexity 36a is provided peripherally with a groove 36b. An O-ring 40 is fitted in groove 36b so as to provide a seal between convexity 36a and concavity 7b. Body 36 is inner peripherally provided with a horizontally axial concavity 36c which is open outward at the opposite vertical flat outer surface thereof in communication with the interior of convexity 36a. The inner diameter of concavity 36c, which is larger than that of concavity 7b, is large enough to fit the outer periphery of ball bearing 39.

Cover 37 is provided with a horizontally axially cylindrical convexity 37a projecting outward from one flat outer surface 37d thereof The outer diameter of convexity 37a is the same as the inner diameter of concavity 36c, so as to tightly fit in concavity 36c. Convexity 37a is provided peripherally with a groove 37b. An O-ring 41 is fitted in groove 37b so as to provide a seal between convexity 37a and concavity 36c. Cover 37 is inner-peripherally provided with a horizontally axial concavity 37c. The inner diameter of concavity 37c is the same size as the outer diameter of seal 35 so as to enable seal 35 to tightly fit therein. The same seal 35 can be used both under heavy and light loads. Cover 37 is provided with a through hole which is open outwardly at the opposite vertical flat outer surface 37e in communication with concavity 37c, so as to allow axle 19L or 19R to pass through. Body 36, into which cover 37 is fitted, is fitted onto the utmost end surface of each axle housing portion 7a', 7a and fastened thereto by bolts 43. As shown in FIG. 4, a retaining portion 36d is formed on the upper surface of body 36 such that each attachment stay 44 is fastened on retaining portion 36d by bolt 45.

Use of needle bearings 34 under heavy loading causes bending of left and right axles 19L and 19R. This bending leads axles 19L and 19R to be damaged or strained and reduces the efficiency of the power transmission. In the present invention, for resistance against heavy loading, bearing holders 38 containing ball bearings 39 are attached to casing 7 to prevent bending of left and right axles 19L and 19R, thereby protecting left and right axles 19L and 19R from damage.

In this regard, as shown in FIGS. 4 and 5, ball bearings 39 are fitted into concavities 36c of bodies 36 and O-rings 40 are fitted into grooves 36b thereof. Bodies 36 are attached to the utmost ends of axle housing portions 7a', 7a by inserting convexities 36a thereof into respective concavities 7b. Also, with respect to covers 37, seals 35 are fitted into concavities 3 7c thereof and O-rings 41 are fitted into grooves 37b. Covers 37 are attached to the outsides of bodies 36 by inserting convexities 37a thereof into concavities 36c of bodies 36. Bolts 43 are laterally inwardly screwed into axle housing portions 7a', 7a through covers 37 and bodies 36.

Thus, the utmost portions of axles 19L and 19R are rotatably supported by respective ball bearings 39 in bearing holders 38. Attachment stays 44 are fastened onto respective retaining portions 7c and 36d by bolts 45, thereby attaching transaxle casing 7 to body frame 1.

A transaxle casing of the present invention, constructed as mentioned above, has the following effect:

Since left and right axle housing portions 7a', 7a of transaxle casing 7 are provided with concavities 7d, needle bearings 34 can be fitted in the respective concavities 7d for journalling left and right axles 19L and 19R when transaxle casing 7 is put under a light load, thereby enabling transaxle casing 7 to be compact.

Also, when bearing holders 38, containing ball bearings 39, are attached to the utmost ends of axle housing portions 7a', 7a, axles 19L and 19R can be supported at the utmost portions thereof by ball bearings 39, when transaxle casing 7 is put under a heavy load, to resist bending of axles 19L and 19R. In this regard, each of bearing holders 38 is provided therein with a concavity 36c having a larger inner-diameter than that of concavity 7b of axle housing portion 7a', 7a, thereby able to fit the outer-periphery of ball bearing 39. Also, bearing holder 38 is provided with an outward convexity 36a, whereby it can be easily disposed coaxially with axle housing portion 7a', 7a by inserting convexity 36a into concavity 7b of axle housing portion 7a', 7a.

Since bearing holders 38 can be easily detached from and attached to the lateral utmost ends of transaxle casing 7, transaxle casing 7 can easily be changed between the light load and heavy load modes according to the size or weight of a vehicle or load. Also, since bearing holders 38 can be manufactured at low cost, transaxle casing 7 can accommodate both modes at low cost.

Furthermore, since bearing holder 38 is integrally provided with retaining portion 36d, allowing bearing holder 38 to be fixed to attachment stay 44, provided on body frame 1, bearing holder 38 can be easily attached to transaxle casing 7. Thus, transaxle casing 7 can be modified to the mode for heavy loaded working, without attaching any additional mounting means.

What is claimed is:

1. A transaxle casing for a vehicle comprising:
   a left axle housing portion and a right axle housing portion which extend laterally outward from said transaxle casing;
   a left axle journalled in said left axle housing portion and a right axle journalled in said right axle housing portion;
   a concavity formed in each of said left and right axle housing portions so as to open outwardly;
   a pair of bearing holders separate from said housing portions containing bearings therein; and
   a convexity formed in each of said bearing holders so as to project outwardly from the outer surface of said bearing holder;
   wherein said bearing holders are capable of being fitted to ends of said left and right axle housing portions by inserting said convexities into said concavities so that said axles are journalled by said bearings in said bearing holders.

2. A transaxle casing as set forth in claim 1, wherein each of said bearing holders is provided with a retaining portion for mounting onto an attachment stay provided on a body frame of said vehicle.

3. A transaxle casing as set forth in claim 1, wherein an outer diameter of each of said convexities has a size identical to an inner diameter of said concavities, so as to be tightly fitted in said concavity.

4. A transaxle casing as set forth in claim 1, wherein said convexities are disposed coaxially with said concavities when said bearing holders are fitted into ends of said left and right axle housing portions.

5. A transaxle casing for a vehicle comprising:
- a left axle housing portion and a right axle housing portion which extend laterally outward from said transaxle casing;
- a left axle journalled in said left axle housing portion and a right axle journalled in said right axle housing portion;
- a pair of bearing holders separate from said housing portions containing a first set of bearings therein;
- a convexity formed in each of said bearing holders so as to project outwardly from the outer surface of said bearing holder; and
- a concavity formed in each of said left and right axle housing portions so as to open outwardly, capable of interchangeably fitting one of a second set of bearings and said bearing holders therein, wherein said concavity is fitted with said second set of bearings when said vehicle is under a light load and said concavity is fitted with said bearing holders, by inserting said convexities into said concavities, so that said axles are journalled by said first set of bearings in said bearing holders, when said vehicle is under a heavy load.

6. A transaxle casing as set forth in claim 5, wherein each of said bearing holders is provided with a retaining portion for mounting onto an attachment stay provided on a body frame of said vehicle.

7. A transaxle casing as set forth in claim 5, wherein said first set of bearings are ball bearings.

8. A transaxle casing as set forth in claim 5, wherein said first set of bearings are large bearings.

9. A transaxle casing as set forth in claim 5, wherein said first set of bearings are high-resistant bearings.

10. A transaxle casing as set forth in claim 5, wherein said second set of bearings are needle bearings.

11. A transaxle casing as set forth in claim 5, wherein said second set of bearings are small bearings.

12. A transaxle casing as set forth in claim 5, wherein said second set of bearings are low resistant bearings.

* * * * *